(12) United States Patent
Heise et al.

(10) Patent No.: US 9,816,732 B2
(45) Date of Patent: Nov. 14, 2017

(54) GEOTHERMAL ENERGY TRANSFER SYSTEM

(71) Applicant: HEAT-LINE CORPORATION, Carnarvon (CA)

(72) Inventors: Lorne R. Heise, Minden (CA); Matthew J. H. Roberts, Haliburton (CA); Fraser F. Newton, Orillia (CA); David S. Lamb, Haliburton (CA)

(73) Assignee: Heat-Line Corporation, Algonquin Highlands (CA)

( * ) Notice: Subject to any disclaimer, the term of this patent is extended or adjusted under 35 U.S.C. 154(b) by 138 days.

(21) Appl. No.: 14/500,016

(22) Filed: Sep. 29, 2014

(65) Prior Publication Data
US 2015/0233608 A1    Aug. 20, 2015

Related U.S. Application Data

(63) Continuation of application No. 13/190,174, filed on Jul. 25, 2011, now abandoned.

(60) Provisional application No. 61/367,166, filed on Jul. 23, 2010.

(51) Int. Cl.
*F24J 3/08* (2006.01)

(52) U.S. Cl.
CPC .................... *F24J 3/081* (2013.01)

(58) Field of Classification Search
CPC . F28D 7/04; F24J 3/08; F28F 2240/00; Y02B 10/40; Y02B 10/70; Y02B 10/10; F24D 2200/11; F24D 11/0214; F24D 11/02571
USPC ....................................................... 165/45
See application file for complete search history.

(56) References Cited

U.S. PATENT DOCUMENTS

| | | |
|---|---|---|
| 2,973,944 A | 3/1961 | Etter |
| 3,499,484 A | 3/1970 | Lanzoni |
| 3,720,259 A | 3/1973 | Fritz et al. |
| 4,325,228 A | 4/1982 | Wolf |
| 4,375,831 A | 3/1983 | Downing, Jr. |
| 4,464,909 A * | 8/1984 | Litzberg ............ F24J 3/06 62/238.6 |
| 4,566,532 A | 1/1986 | Basmajian |
| 4,633,676 A | 1/1987 | Dittell |
| 4,907,418 A | 3/1990 | DeFazio |
| 4,920,757 A | 5/1990 | Gazes et al. |
| 4,993,483 A | 2/1991 | Harris |
| 5,109,920 A | 5/1992 | Merryfull |
| 5,224,357 A | 7/1993 | Galiyano et al. |

(Continued)

FOREIGN PATENT DOCUMENTS

| | | |
|---|---|---|
| CN | 201392112 Y | 1/2010 |
| JP | 2009-103367 A | 5/2009 |
| WO | 2008058687 A | 5/2008 |

OTHER PUBLICATIONS

MacKenzie, K; Search Report from corresponding PCT Application No. PCT/CA2011/000846; search completed Nov. 7, 2011.

*Primary Examiner* — Travis Ruby
(74) *Attorney, Agent, or Firm* — Blake, Cassels & Graydon LLP; John R. S. Orange

(57) ABSTRACT

An energy transfer unit for a geothermal system includes an outer housing. A heat exchanger is located within the housing. An inlet pipe extends from the housing to the heat exchanger to convey heat transfer fluid to the heat exchanger and an outlet pipe extends from the housing to the heat exchanger to convey heat transfer fluid from the heat exchanger.

25 Claims, 15 Drawing Sheets

(56) References Cited

U.S. PATENT DOCUMENTS

| | | |
|---|---|---|
| 5,313,804 A | 5/1994 | Kaye |
| 5,509,462 A | 4/1996 | Demko et al. |
| 5,623,986 A | 4/1997 | Wiggs |
| 5,758,514 A | 6/1998 | Genung et al. |
| 5,816,314 A | 10/1998 | Wiggs et al. |
| 5,819,681 A | 10/1998 | Barnes et al. |
| 5,937,665 A | 8/1999 | Kiessel et al. |
| 5,946,928 A | 9/1999 | Wiggs |
| 6,068,047 A | 5/2000 | Buchhave |
| 6,142,215 A | 11/2000 | Paulsen et al. |
| 6,145,584 A | 11/2000 | Baynes et al. |
| 6,325,139 B1 | 12/2001 | Maruyama |
| 6,615,601 B1 | 9/2003 | Wiggs |
| 6,751,974 B1 | 6/2004 | Wiggs |
| 6,789,608 B1 | 9/2004 | Wiggs |
| 6,931,879 B1 | 8/2005 | Wiggs |
| 7,080,524 B2 | 7/2006 | Wiggs |
| 7,234,314 B1 | 6/2007 | Wiggs |
| 7,254,955 B2 | 8/2007 | Otake et al. |
| 7,401,641 B1 | 7/2008 | Wiggs |
| 7,591,145 B1 | 9/2009 | Wiggs |
| 7,617,697 B2 | 11/2009 | McCaughan |
| 7,658,079 B2 | 2/2010 | Bailey et al. |
| 8,132,424 B2 | 3/2012 | Burn |
| 2004/0149422 A1 | 8/2004 | Jungwirth |
| 2010/0172699 A1 | 7/2010 | Saint-Marcoux |

\* cited by examiner

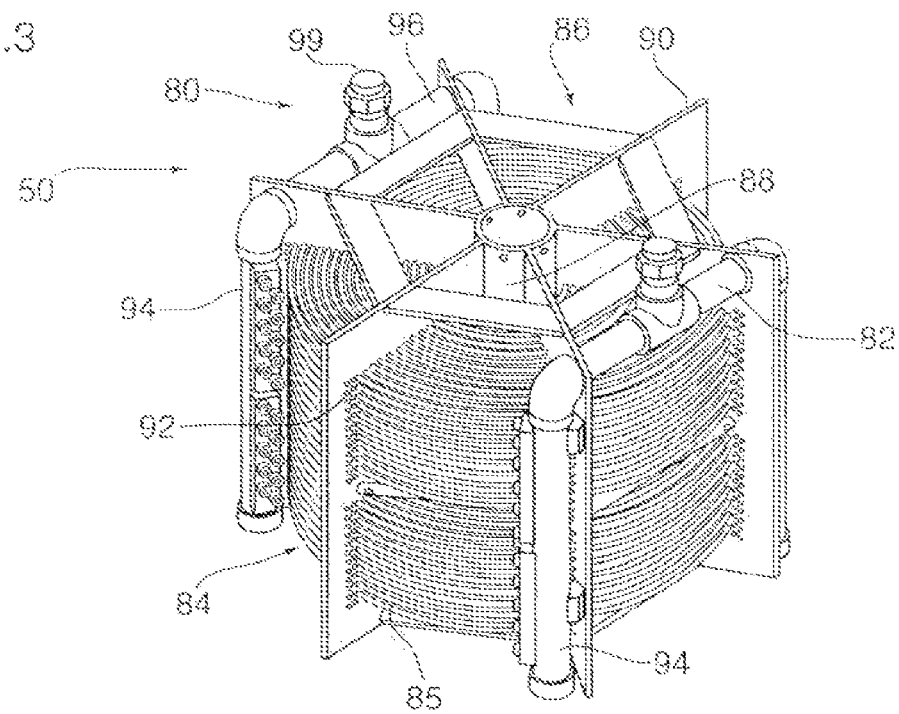
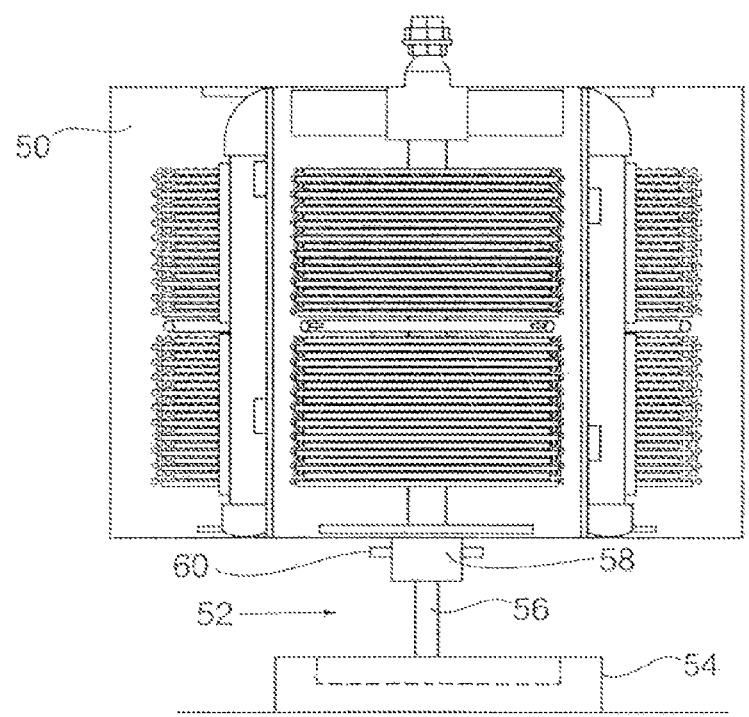

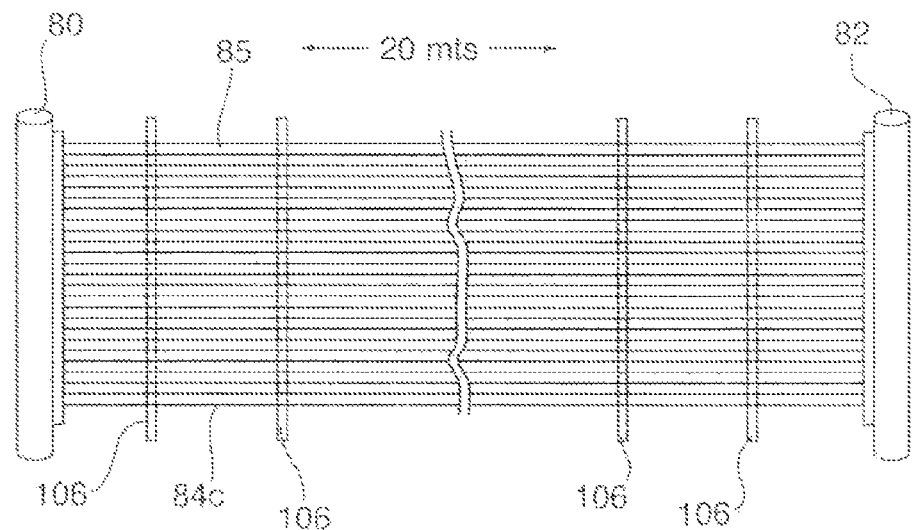
Fig.9
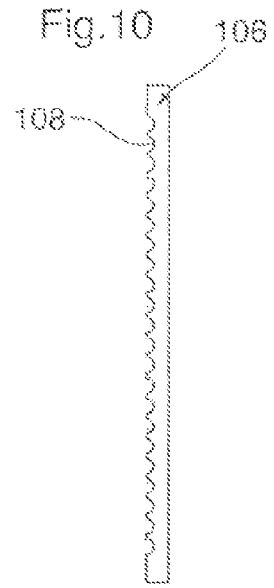
Fig.10
Fig.11

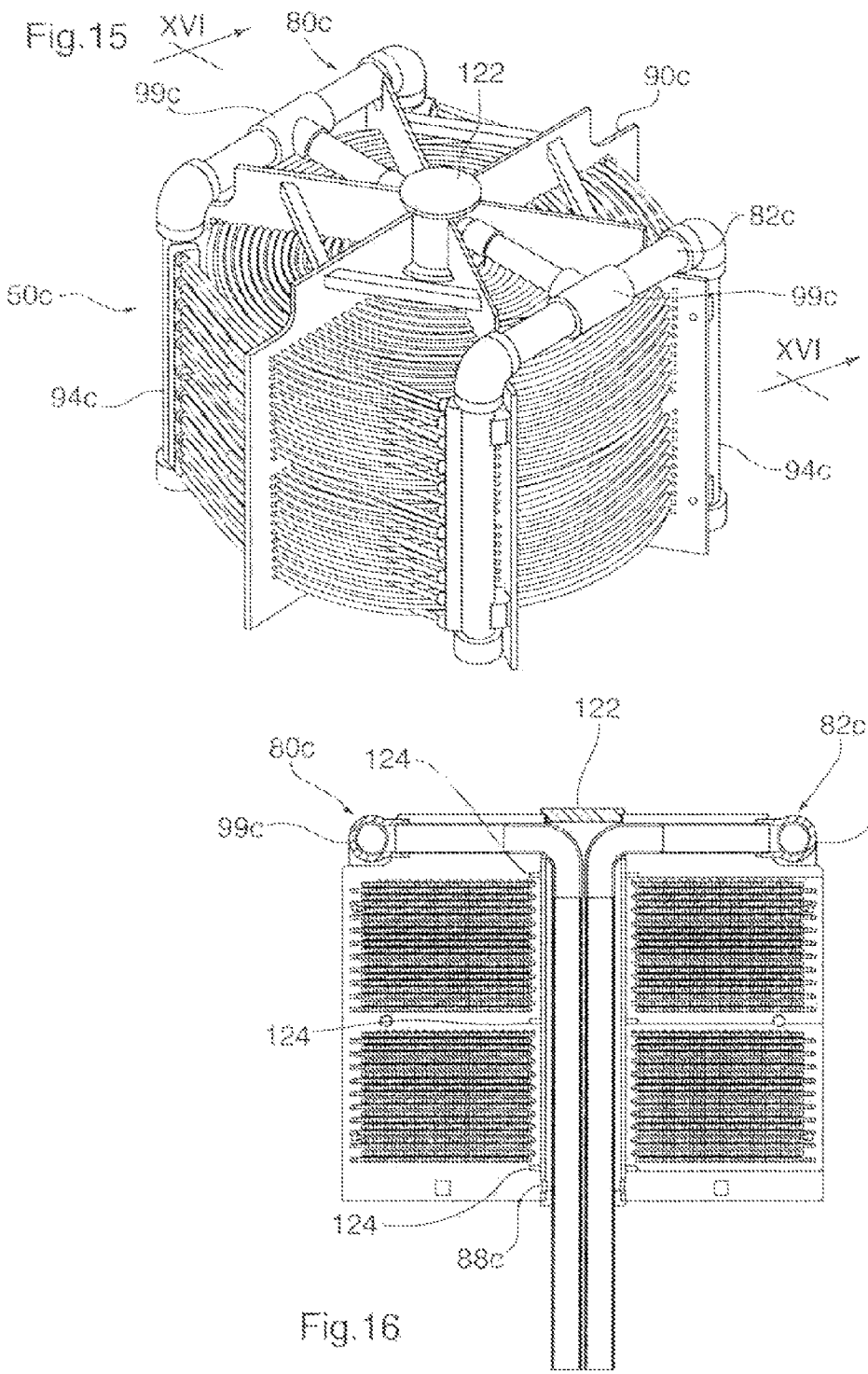

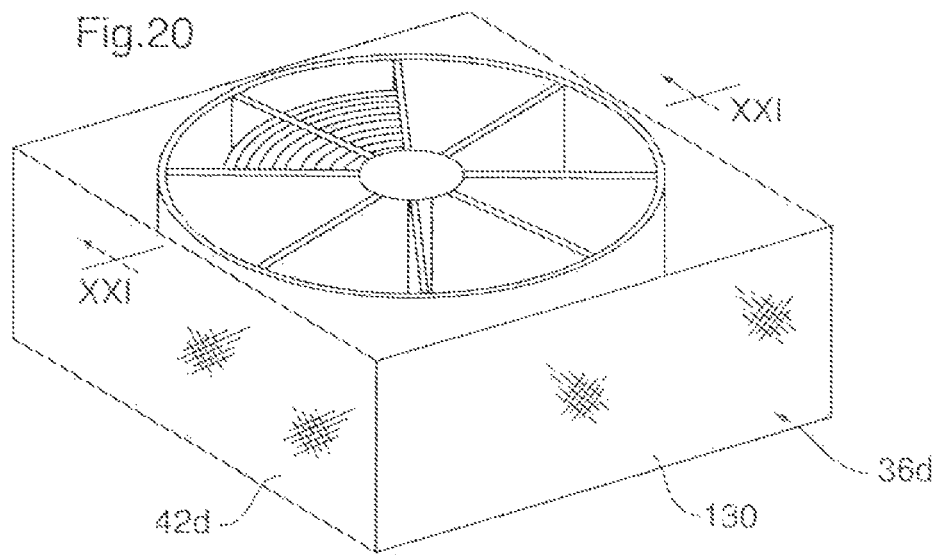
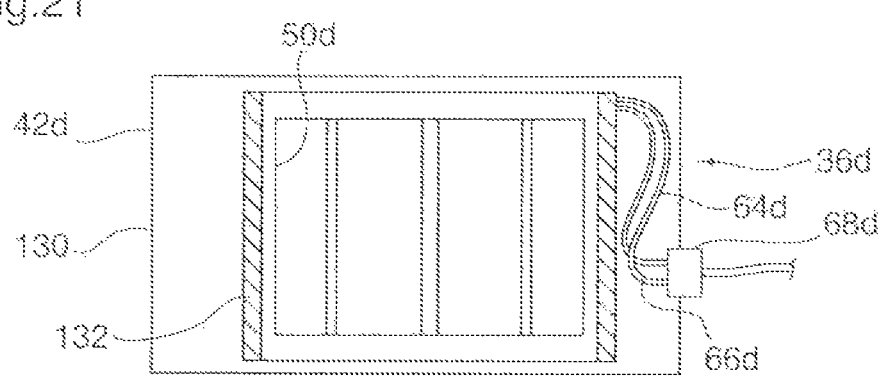

GEOTHERMAL ENERGY TRANSFER SYSTEM

CROSS REFERENCE TO RELATED APPLICATIONS

This application is a Continuation of U.S. application Ser. No. 13/190,174 filed Jul. 25, 2011, which claims priority from U.S. Provisional Application No. 61/367,166 filed on Jul. 23, 2010; the entire contents of which are incorporated herein by reference.

FIELD OF THE INVENTION

The present invention relates to geothermal, also known as geo-exchange, energy transfer systems.

SUMMARY OF THE INVENTION

It is well known to use a heat pump to transfer energy between a particular location, such as a building, and the surrounding environment. The heat pump uses a closed cycle that passes a refrigerant through an expansion phase that requires the absorption of external energy and a compression phase which rejects energy. In order to supply energy to a particular location, the rejected heat is transferred in to the heating system of that location and the energy required to effect the expansion of the refrigerant is absorbed from an external source. Similarly, when heat is to be extracted from the location, the location supplies the energy for the expansion of the refrigerant and the heat generated during compression is rejected to the external source.

The external source may be the air itself, as is the case with traditional air conditioning units or heat pumps. However, such an arrangement has a poor efficiency due to fluctuations in the air temperature.

A preferred external source has a substantially constant temperature and the ground or large body of water are typically used. Such systems are typically referred to as geo-thermal or geo-exchange systems. It is therefore known to provide a heat exchange loop between the heat pump and such a source so that heat may be absorbed in to the loop to supply energy to the heat pump or may be rejected from the loop to remove energy from the heat pump. The loops are typically an extensive run of pipe containing a saline, glycol or ethyl alcohol based heat exchange fluid. The pipe is buried in a trench between one or two meters below the normal surface. At that depth, the earth is at a substantially constant temperature and provides a energy source to either provide energy to or absorb energy from the heat transfer fluid. However, because of the temperature differential between the heat exchange fluid and the surroundings is small, such installations require a relatively large area, in the order of several acres, to provide the necessary surface area to effect energy transfer between the surroundings and the fluid.

An alternative arrangement is to provide for vertical heat transfer loop which requires drilling one or more bore holes to a significant depth in order to get the necessary surface area. Both of these options, therefore, relatively expensive and may only be used in a limited number of locations.

Where available, a large body of water may be used as the energy source. The heat transfer loop is placed in the water. This however may disturb environmentally sensitive areas and can be unsightly and difficult to install in an orderly manner.

It is therefore an object of the present invention to obviate or mitigate the above disadvantages.

According to one aspect of the present invention there is provided an energy transfer unit for a geothermal system. The energy transfer unit includes an outer housing with a heat exchanger located within the housing. An inlet pipe extends from the housing to the heat exchanger to convey heat transfer fluid to the heat exchanger. An outlet pipe extends from the housing to the heat exchanger to convey heat transfer fluid from the heat exchanger.

BRIEF DESCRIPTION OF THE DRAWINGS

Embodiments of the invention will now be described by way example only with reference to the accompanying drawings in which:

FIG. 3 is a perspective view of a heat exchange unit used in the energy transfer unit of FIG. 2;

FIG. 4 is a side elevation of the units shown in FIG. 3;

FIG. 9 is a elevation of components used in an alternative embodiment of heat exchange unit;

FIG. 10 is a side elevation of a component used in the assembly of FIG. 9; and

FIG. 11 is a perspective view of the heat transfer unit assembled from the components of FIGS. 9 and 10.

FIG. 15 is a perspective view of the heat exchanger unit used in the embodiment of FIG. 12;

FIG. 16 is a view on the line XVI-XVI of FIG. 15;

FIG. 20 is a perspective view of a further embodiment; and

FIG. 21 is a section on the line XXI-XXI of FIG. 20.

DETAILED DESCRIPTION OF THE INVENTION

Figure 1:
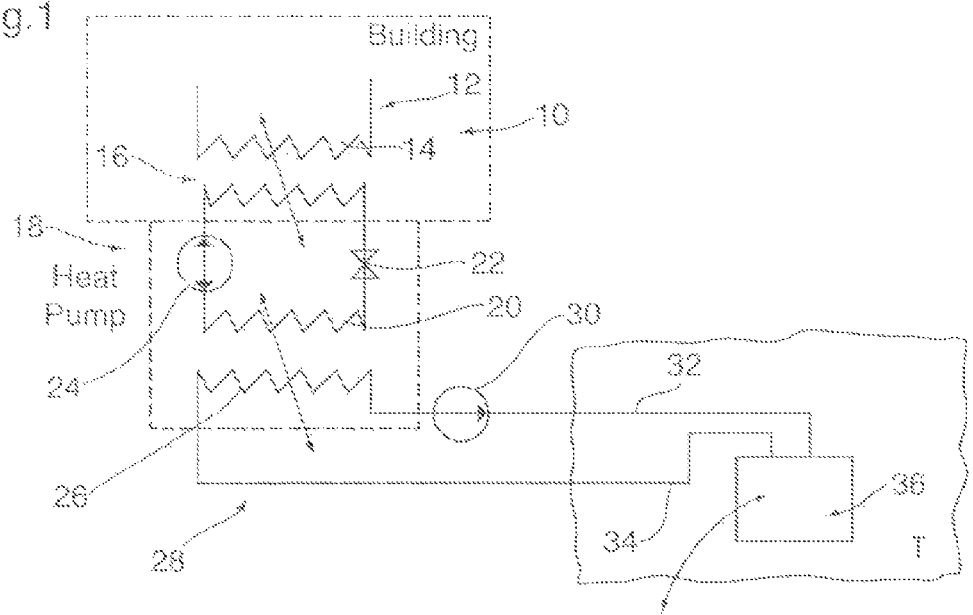
FIG. 1 is a schematic representation of an energy transfer system.

Referring therefore to FIG. 1, a building 10 has a heating and cooling system 12 to distribute heat through the building or to remove heat from the building. The heat distribution system may be an air circulating system, or a water circulating system that transfers heat between different areas of the building and a heat source. The heating and cooling system 12 includes a heat exchanger 14 that cooperates with a heat exchanger 16 to transfer heat between a heat pump 18 and the building 10. The heat pump 18 is of conventional construction and includes a heat exchanger 20 connected in a refrigerant loop to the heat exchanger 16 through a throttle valve 22 and a compressor 24. Expansion of a refrigerant through the throttle 22 causes heat to be absorbed in to the refrigerant and compression of the refrigerant through the pump 24 causes heat to be rejected. The heat exchangers 16 and 20 absorb or reject the heat depending upon the mode of the operation of the refrigerant cycle.

The heat exchanger 20 cooperates with a further heat exchanger 26 to transfer heat between the refrigerant loop and a heat transfer loop indicated at 28. The heat transfer loop 28 includes a pump 30 that circulates a heat transfer fluid, typically an ethyl alcohol mixture, through a return pipe 32 and a supply pipe 34. The pipes 32,34 are connected to an energy transfer unit 36 that operates in a manner described in more detail below to transfer energy between the heat transfer loop and the immediate surrounding indicated at T.

As will be described in more detail below, the heat transfer unit 36 may be buried within the ground, may be located within a body of water such as a lake, pond or river, or may be surface mounted within an enclosure. In each case, the immediate surroundings act as an energy reservoir to receive or contribute energy to the energy transfer unit 36.

Figure 2:
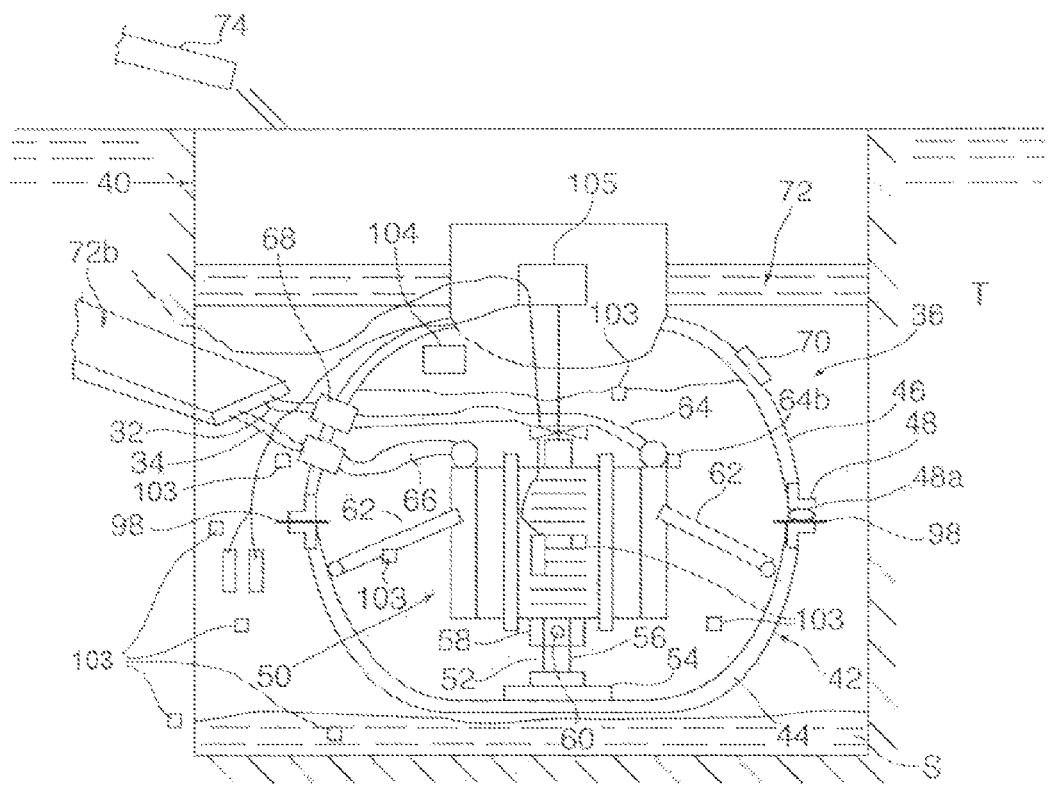
FIG. 2 is a side elevation of a energy transfer unit used in the system of FIG. 1.

Referring to FIG. 2, heat transfer unit 36 is designed to be buried within the ground T. A pit 40 is excavated in the ground to a depth at which a substantially constant temperature and stable water table is to be expected. In North America, a depth of between 8 and 12 feet is satisfactory.

The energy transfer unit 36 includes an outer housing 42 that, in the embodiment shown in FIG. 2, is spherical. The housing 42 is formed in two semi-cylindrical shells 44,46 that mate along a flange 48. The housing 42 is designed to be fluid tight with a seal incorporated in to the flange 48 and to be formed from a thermal and electrically conductive material. In practice, an electrical conductivity of 10-15 w/m$^2$ or greater has found to be satisfactory. Shells made from a thermal setting resin. PTFE (polytetraflon) or polymer compound, or impregnated with electrically conductive materials such as metal strand, graphite, carbon, nano-tubes, copper mesh, or similar materials are preferred.

A metallic or non-metallic PTFE (polytetraflon) heat exchange core 50 is located within the housing 42 on a stand 52. The stand 52 has a base 54 and a post 56 that passes through a collar 58 at the centre of the core 50. A pin 60 secures the collar 58 to the post 52 and maintains the core 50 in spaced relationship from the housing 42. Stays 62 extend between the part cylindrical shell 44 and the core 50 to stabilize the core 50 within the housing 42. The return pipe 32 and supply pipe 34 are connected to the core 50 through an inlet pipe 64 and outlet pipe 66. Couplings 68 releasably secure the return and supply pipes 32, 34 to the inlet and supply pipes 62,66. The coupling 68 is of known construction allowing the rapid disconnection of the return and supply pipes 32,34 from the energy transfer unit 36.

The housing 42 is filled with a buffer fluid 64b through a plug 70 that may be sealed to the housing 42 after filling. The buffer fluid may be water, saltwater, electrolyte or other material capable of energy transfer and may of course be pumped in to the housing 52 after installation.

As can be seen in FIG. 2, the energy transfer unit 36 is lowered in to the pit 40 and stably supported on a base of sand or other fine materials or undistributed soil T. The material, S, supports the housing 42 and ensures a close contact between the housing and the surrounding earth T. The pit 40 may be filled with sands, granular material, concrete or other proprietary compounds S to completely encompass the energy transfer unit 36.

The fill material is chosen to ensure a close contact between the exterior surface of the housing 42 and impart good energy transfer characteristics. A thermal barrier 72 is inserted into the pit during back-filling at the top of the housing 42, below the typical frost line, to extend across the housing 42 horizontally and inhibit solar gain in the pit and heat transfer from the pit vertically to the atmosphere. It is also preferred that a thermal barrier 72b is installed above the supply and return pipes 32,34 to inhibit undesirable heat transfer. It has also been found desirable to maintain a relatively high moisture content within the pit 40 and waste water, such as rain water or other run off, may be directed through the pipes 74 in to the pit 40 as convenient.

The details of the core 50 can be seen in FIGS. 3 and 4. The core 50 includes an inlet manifold 80 and an outlet manifold 82. Each of the manifolds 80, 82 includes a pair of legs 94, extending along one side of the plates 90 interconnected by a bridging pipe 96. A T connector 99 is located on the bridging pipe 96 for connection to the inlet pipe 64 or outlet pipe 66 respectively. T connector 99 is designed and positioned to avoid air entrapment and avoid the need for air venting during filling and purging.

An array 84 of heat exchange tubes 85 are spirally wound between the inlet manifold 80 and outlet manifold 82. The array 84 is supported in a frame structure 86 that comprises a central tubular column 88 with radial plates 90 secured to and extending from the central column 88. Each of the plates 90 has a matrix of holes 92 sized to support the individual tubes 85 of the array 84. The radial plates 90 therefore maintain the tubes 85 in spaced relationship and guide them in the spiral that runs radially inwardly from one of the legs 94 of the inlet manifold 80 toward the centre, is jogged at its inner extremity to axially displace the tube and then radially outwardly from the centre to one of the legs 94 of the outlet manifold 82. A pair of spirals are provided, each running from a respective leg 94 of the inlet manifold 80 to a respective leg 94 of the outlet manifold 82.

The legs 94 have a series of outlets that connect to individual tubes 85 of the array 84 so that the flow is evenly divided amongst the multiple tubes 85 of the array 84 allowing variable and balanced flows. The tubes may be manufactured using UV resistant polymers.

The stand 52 is connected to the column 88 through the collar 58 located on the lower surface of the core 50, as best seen in FIGS. 3 and 4, so as to be vertically adjustable.

Figure 5:
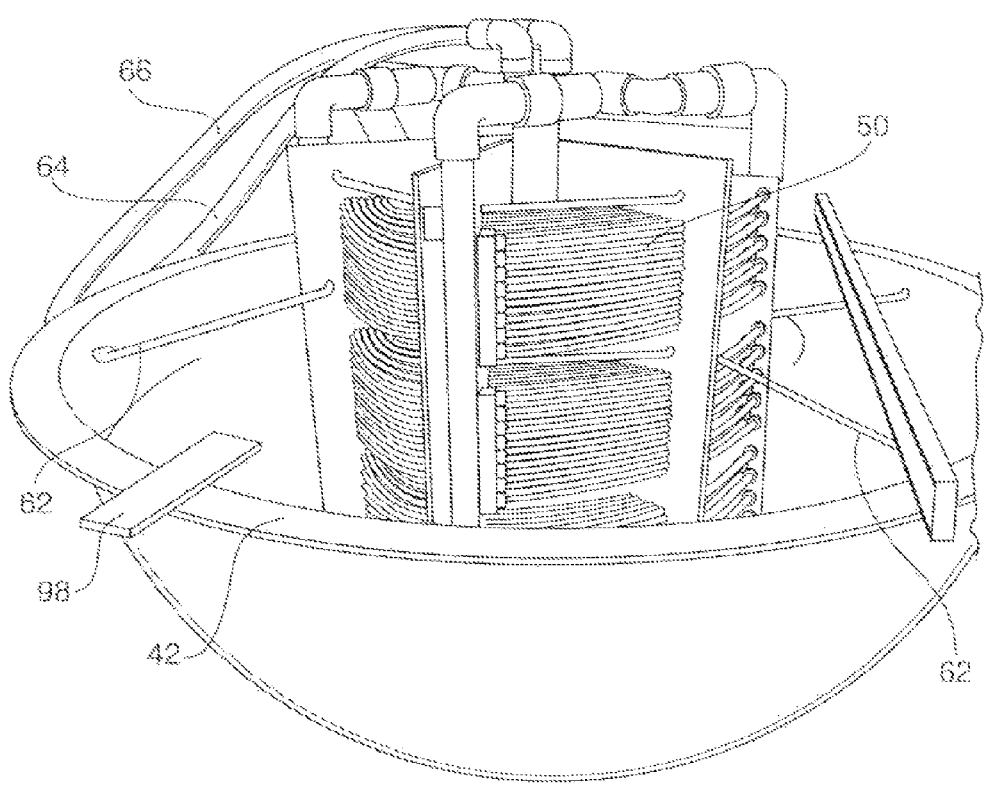
FIG. 5 is a perspective view of an energy transfer unit during assembly.

To assemble the energy transfer unit, the core 50 is located on the stand 52 which is then placed within the lower housing 44 as seen in FIG. 5. Stays 62 are connected between the core 50 and the housing 42 to stabilize the core. The upper housing 46 is then located on the lower housing and the couplings 68 connected through the apertures provided in the upper housing. The upper and lower housings 44, 46 are connected along the flange 58 using a sealant material 48A to provide a unitary sealed construction. A fluid or electrically driven paddle 105, and/or a mechanical pump 104 is located within the upper housing 46.

To promote electrical bonding of the buffer fluid 64b to the back fill material, individual fingers 98 of stainless steel or other suitable metallic material are placed across the flange 84 to connect electrically the interior and exterior of energy transfer unit 36. Various control and monitoring sensors 103 may be embedded and positioned at key locations of the unit 36, for connection and interaction with similar sensors around the unit 36.

The unit 36 may then be lowered into the pit 40 and supported on the undisturbed soil T or initial layer of sand S. The return and supply pipes 32, 34 are run from the building to the pit 40 and connected to the inlet pipe 64 and outlet pipe 66 through respective couplings 68. Following the installation of the energy transfer unit 36, buffer fluid 64b is installed and sealed at plug 70. The pit is back-filled and thermal installation barriers 72 and 72b placed directly over the top of the energy transfer unit 36 and return and supply pipes 32,34 and couplings 68.

With the energy transfer unit 36 installed, the heat transfer fluid is circulated through the pipes 32,34 which causes flow through the core 50 and the heat exchanger 26. Depending upon the mode of operation of the heat pump 18, heat is either rejected in to the heat exchanger 26 or absorbed by the heat exchanger 26. As the fluid passes through the core 50, the temperature differential between the fluid within the core 50 and the buffer fluid causes a net energy transfer between the core and the buffer fluid. Similarly, an energy transfer occurs across the wall of the housing 52 from the sand S in to the buffer fluid. The energy mass, provided by the surrounding earth T, absorbs or supplies the energy required to maintain a stable uniform temperature within the buffer fluid. When used, the paddle 105, or a mechanical pump 104, is used to circulate the buffer fluid.

Figure 7:
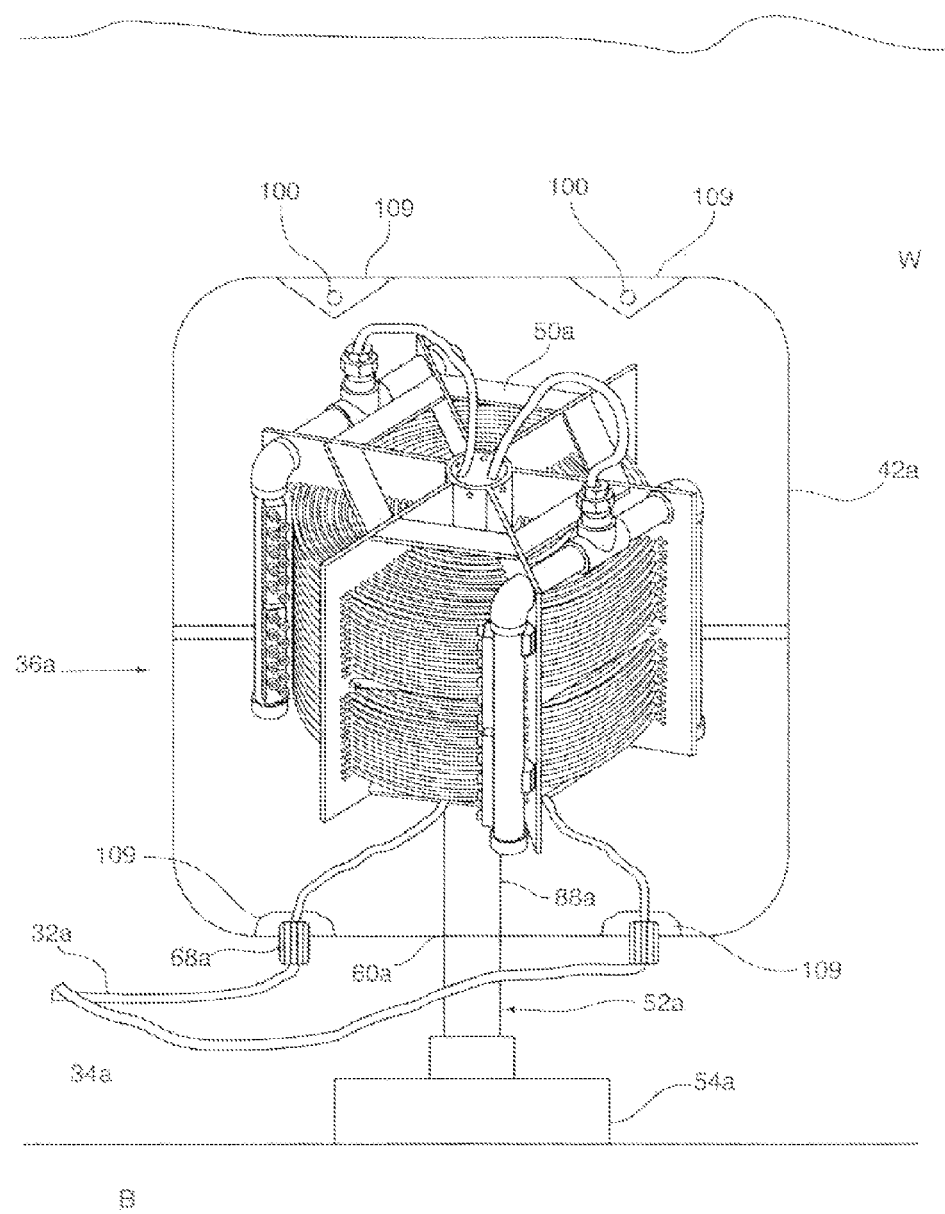
FIG. 7 is a view similar to FIG. 2 of an energy transfer unit for installation within a body of water.

In initial testing, the following results were obtained using a Water Furnace GT64 heat pump.

the arrangement shown in FIG. 7, the core 50a is located within a housing 42a. The housing 42a in the embodiment shown in FIG. 7 is cylindrical rather than spherical, although it will be appreciated that a spherical housing may be used if preferred. The core 50a is supported upon a column 88a that extends down to the lower wall of the housing 42a. The stand 52a is located within the column 88a and secured by a pin 60a. The column 88a is conveniently plugged so as to provide a sealed enclosure within the housing 50a while still allowing the stand 52a to be inserted and adjusted for height. Alternatively, the stand 52a may be replaced by a tether or similar anchor device between the base 54a and core 50a.

The base 54a has an annular recess to receive ballast and anchor the unit 36a to the bed of the lake or river. Return pipe 32a and supply pipe 34a are connected to the core 50a through couplings 68a at the lower wall of the housing 42a. These are then run along the bed B of the lake or river (or similar water body including sea, shore—well, or aquifer) to the heat pump. The interior of the housing 42a is filled with buffer fluid through ports 109 and the upper portion of

|  |  | Cooling |  | Heating |
|---|---|---|---|---|
| Flow Rate in GPM |  |  |  |  |
| Water IN pressure: | a) | 11 psi | a) | 11 psi |
| Water OUT pressure: | b) | 5.5 psi | b) | 5.5 psi |
| Pressure Drop = a − b | c) | 5.5 psi | c) | 5.5 psi |
| Look up flow rate in table | d) | 15 gpm |  |  |
| Temperature Rise/Drop Across Coax Heat Exchanger |  |  |  |  |
| Water IN temp: | e) | 53.1 F./C. | e) | 47.8 F./C. |
| Water OUT temp: | f) | 60.4 F./C. | f) | 41.8 F./C. |
| Temperature Difference: | g) | 7.3 F./C. | g) | 6 F./C. |
| Temperature Rise/Drop Across Air Coil |  |  |  |  |
| Supply Air Temp: | h) | 60.8 F./C. | h) | 64.4 F./C. |
| Return Air Temp: | i) | 36.3 F./C. | i) | 92.1 F./C. |
| Temperature Difference: | j) | 24.5 F./C. | j) | 27.7 F./C. |
| Heat of Rejection (HR)/Heat of Extraction (HE) | k) | 500 | 500 for water or 485 for ethanol/methanol etc. |  |
| Brine Factor |  |  |  |  |
| HR/HR = d × g × k | l) | 54750 (BTU/kW)/HR | l) | 45000 (BTU/kW)/HR |
| Weal |  |  |  |  |
| Volts: | m) | 240 | m) | 240 |
| Total Amps (Comp. + Fan) | n) | 19.4 | n) | 37 |
| Watts = m × n × 0.85 | ) | 3957.6 | o) | 7548 |
| 0.85 |  |  |  |  |
| Capacity |  |  |  |  |
| Cooling Capacity = I − (o×3.413) | p) | 41,243 BTU/HR | p) | 70,761 BTU/HR |

Figure 6:
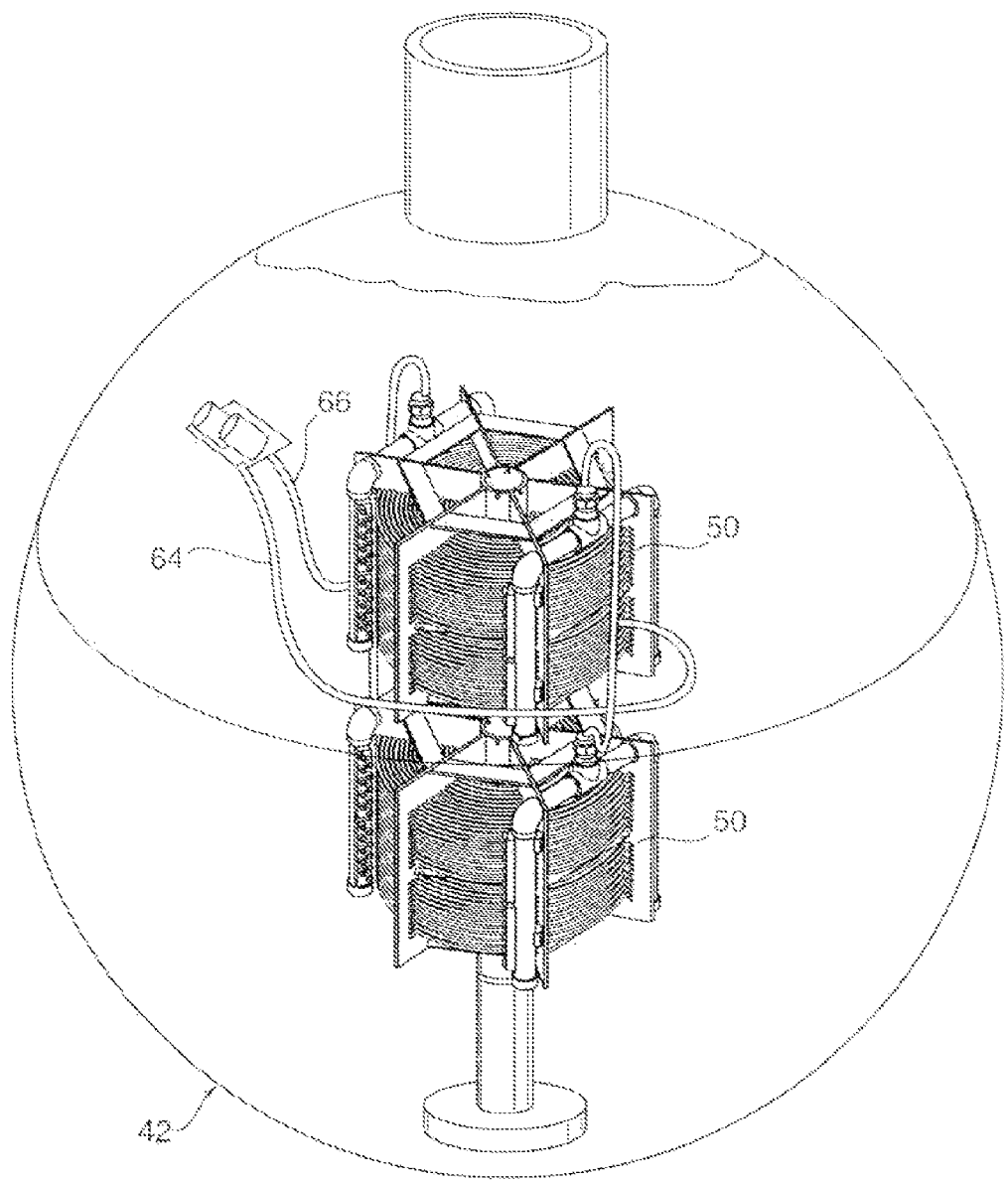
FIG. 6 is a representation similar to FIG. 2 of an alternative embodiment of energy transfer unit.

The modular arrangement of the core 50 facilitates the sizing of the energy transfer unit 36 to meet desired load capacity. As can be seen in FIG. 6, the modular arrangement of the cores 50 allows the cores to be stacked within the housing 42 and thereby increase the energy transfer capacity. The inlet and outlet pipes 64,66 are connected to each of the manifolds on the units 50 thereby distributing the flow of heat transfer fluid.

In the embodiments of FIGS. 2 through 6, the energy transfer unit 36 is located within the ground. Where a body of water is available, the energy transfer unit may readily be installed within the body of water, thereby avoiding the need for excavating the pit 40. Such an arrangement is shown in FIG. 7 where like components will be identified with a like reference number, but with a suffix "a" added for clarity. In housing 42a is conveniently formed with attachment lugs 100 to allow for lowering and raising of the unit during installation and service. To facilitate installation and servicing, the heat exchange core 50a may be pressurized with air, displacing the heat exchange fluid, which results increased buoyancy that may be beneficial for installation and service.

The operation of the unit 36a is similar to that described above and it will be noted that the base 54a is the only point of contact between the bed B and the energy transfer unit 36a. A minimal footprint is thus provided and the unit 36a may readily be retrieved if servicing is required.

In tests performed in a lake using the embodiment of FIG. 7, with a Water Furnace GT64 heat pump, the following results were obtained:

|  |  | Cooling |  | Heating |  |
| --- | --- | --- | --- | --- | --- |
| Flow Rate in GPM |  |  |  |  |  |
| Water IN pressure: | a) | 11 | psi | a) 11 | psi |
| Water OUT pressure: | b) | 5.5 | psi | b) 5.5 | psi |
| Pressure Drop = a − b | c) | 5.5 | psi | c) 5.5 | psi |
| Look up flow rate in table | d) | 15 | gpm | d) 15 | gpm |
| Temperature Rise/Drop Across Coax Heat Exchanger |  |  |  |  |  |
| Water IN temp: | e) | 53.1 | F./C. | e) 47.8 | F./C. |
| Water OUT temp: | f) | 60.4 | F./C. | f) 41.8 | F./C. |
| Temperature Difference: | g) | 7.3 | F./C. | g) 6 | F./C. |
| Temperature Rise/Drop Across Air Coil |  |  |  |  |  |
| Supply Air Temp: | e) | 60.8 | F./C. | e) 64.4 | F./C. |
| Return Air Temp: | f) | 36.3 | F./C. | f) 92.1 | F./C. |
| Temperature Difference: | g) | 24.5 | F./C. | g) 27.7 | F./C. |
| Heat of Rejection (HR)/Heat of Extraction (HE) | k) | 500 | | 500 for water or 485 for ethanol/methanol etc. | |
| Brine Factor |  |  |  |  |  |
| HR/HR = d × g × k | l) | 54750 | (BTU/kW)/HR | l) 45000 | (BTU/kW)/HR |
| Watts |  |  |  |  |  |
| Volts: | m) | 220 |  | m) 220 |  |
| Total Amps (Comp. + Fan) | n) | 19.4 |  | n) 37 |  |
| Watts = m × n × 0.85 | o) | 3627.8 |  | o) 6919 |  |
| 0.85 |  |  |  |  |  |
| Capacity |  |  |  |  |  |
| Cooling Capacity = I − (o×3.413) | p) | 42,368 | BTU/HR | p) 68,615 | BTU/HR |
| Heating Capacity = I + (o×3.413) |  |  |  |  |  |

It will be appreciated that the core 50*a* may be directly installed within the lake W and anchored by the stand 52*a* without the provision of the housing 42*a*, if preferred. However, it has been found that the provision of the housing 42*a* provides mechanical protection and improved aquatic habitat and therefore its use is preferred. However, the advantages of lower footprint and enhanced performance over conventionally installed lake based units may be obtained without the use of the housing 42*a*.

Figure 8:
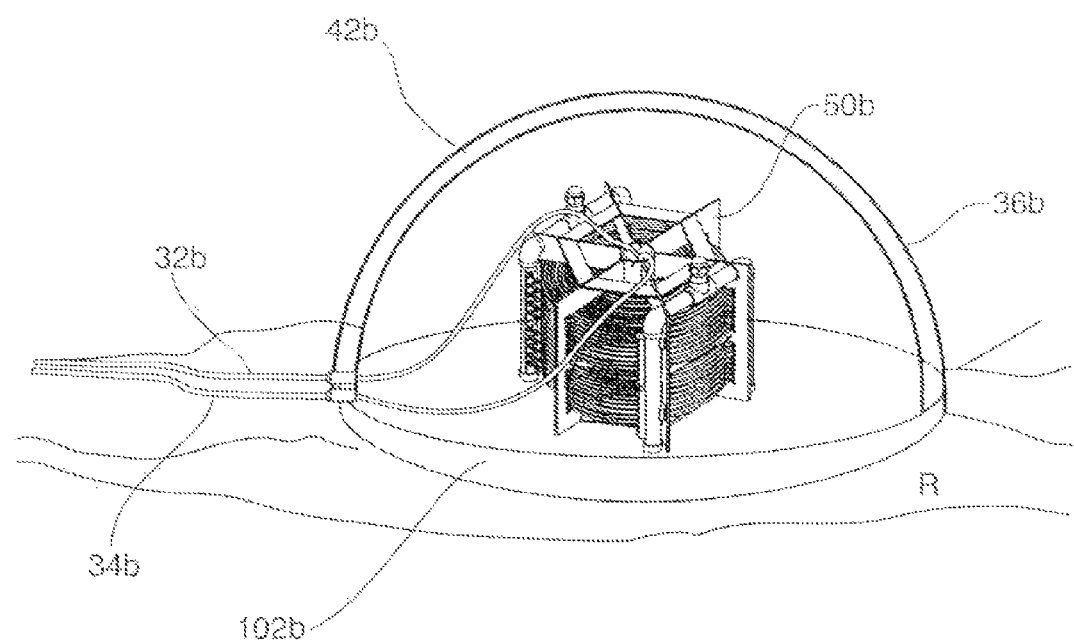
FIG. 8 is a schematic representation of an energy transfer unit located on the surface.
Figure 12:
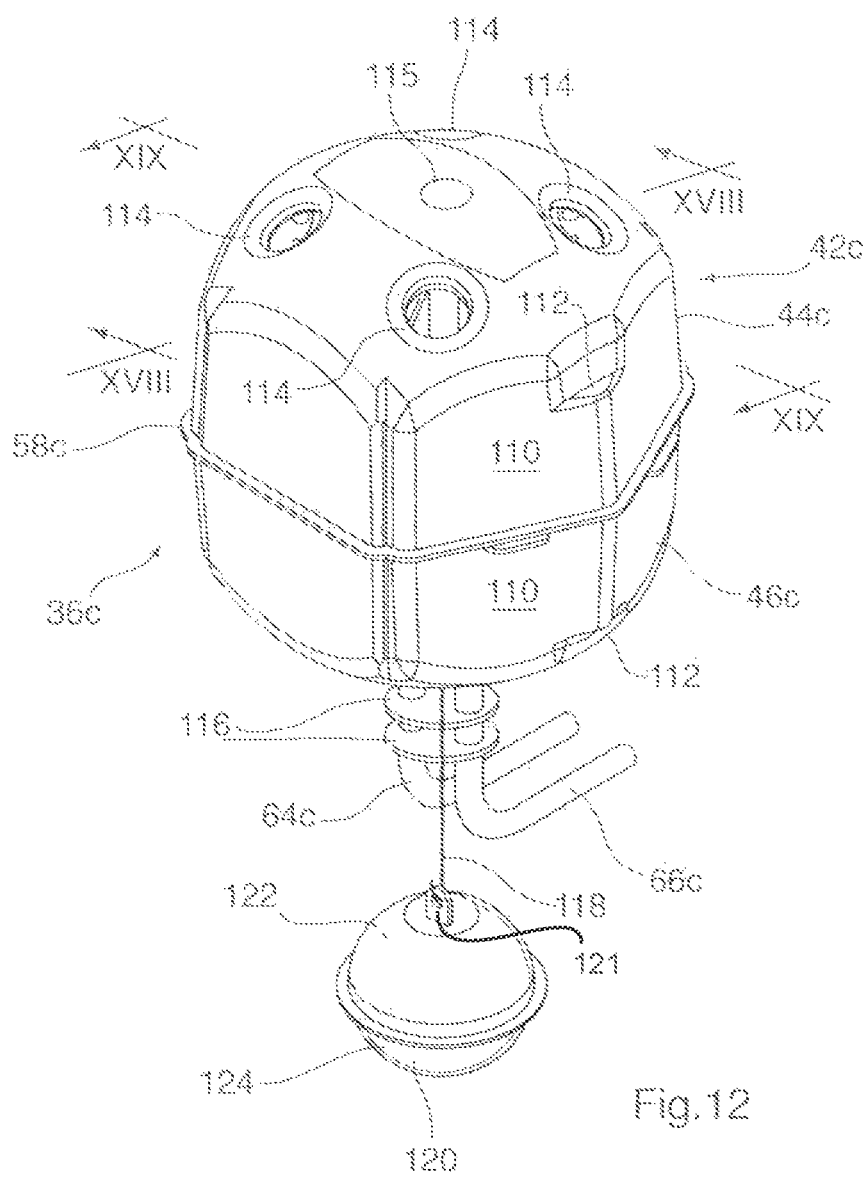
FIG. 12 is a perspective view of a further embodiment.

A similar arrangement is shown in FIG. 8 in which like components will be identified with like reference numerals with a suffix "b" added for clarity. In the arrangement shown in FIG. 8, provision if made for the energy transfer unit 36*b* in an environment where it is impractical to excavate, such as on bedrock and the body of water is not present. In this arrangement, the core 50*b* is installed within a footing 102*b* and connections made to the return and supply pipes 32*b*, 34*b* respectively. A dome housing 42*b* is then located over the footings 102*b* and a thermally conductive slurry pumped into the dome 42*b*. The core 50*b* is encompassed in the slurry, which may conveniently be a thermally conductive concrete, to supply energy from the rock R in to the core 50*b*.

As described in the embodiments above, the core 50 is formed by threading the individual tubes of array 84 through the hole 92 and the plates 90. An alternative arrangement for forming the core 50 is shown in FIGS. 9 through 11. Like reference numerals will be used to indicate like components. The tubes 85 of the array 84 are connected to manifolds 80, 82. The spacing between the manifolds 80, 82 may be typically in the order of 20 meters, although the length of the tubes 85 will depend upon the overall dimensions of the unit 50 to be provided. Spacers 106 indicated in FIG. 10 are then placed at specified intervals between the manifolds 80, 82. The spacers 106 have part circular notches 108 on one face that are arranged to snugly clip over the individual tubes of the array 84. The spacers 106 therefore maintain the tubes spaced apart in the same manner as the plates 90. The array 84 is then spirally wound with one of the manifold in the center. The spacing of the spacers 106 is selected so that they are on adjacent passes and maintain the tubes of the array 84*c* uniformly spaced. The spirally wound array may then be located within a simplified support structure with one of the manifolds at the center and the other manifold at the periphery of the array.

In the above embodiments, a sealed housing containing the buffer fluid is used. A further embodiment, similar to that of FIG. 7 for use in a body of water, is shown in FIGS. 12 to 19 in which enhanced energy transfer is attained by promoting flow of fluid over the heat exchanger core. Like components will be indicated by like reference numerals with a suffix "c" added for clarity.

Referring to FIGS. 12 to 19, the housing 42*c* is formed with shells 44*c*, 46*c*, each of which has a hexagonal cross section mid portion, to provide flats 110, subtended by domes 111. The upper and lower shells 44*c*, 46*c* are provided with shoulders 112 that locate the upper and lower outer corners of the plates 90*c* and secure the core 50*c* within the housing 42*c*. The hexagonal cross section permits peripheral wall of the housing 42*c* to be relatively closely spaced from the outer periphery of the core 50*c* around the periphery of the core. The configuration of the housing 42*c*, also facilitates installation by ensuring that the unit will not roll along a downhill grade. The location of the core 50*c* by shoulders 112 allows the shells 44*c*, 46*c* to be joined to one another after assembly along the flange 58*c* to provide an integral tamper proof unit, or to accommodate bolts or other fastenings to join the housings 44*c*, 46*c* in a secure manner. A metallic disc may be incorporated into the upper housing 46*c* to enable location of the unit 36*c* after installation.

Heat exchange fluid is provided by inlet and outlet pipes 64*c*, 66*c*. The pipes 64*c*, 66*c* are fed centrally through holes in the lower shell 44*c* and along the column 88*c* for connection to the manifolds 82*c*, 84*c*. The pipes 64*c*, 66*c* are maintained in spaced relationship by guide rings 116 that are located at spaced intervals along a tether 118. The tether 118 is formed of polyester rope or similar and connected to an anchor 120. The anchor 120 is formed of two part spherical shells 122,124 that are connected to one another to define a void 123 and filled with concrete. The tether 118 is secured to a fixture 121 inserted in to the concrete within the void 123 and additional ballasts may be added as needed. The anchor 120 and tether 118 orient the unit 36c vertically, due to the natural buoyancy of housing, and reduce the footprint on the lake bed.

Apertures 114 are provided in the upper and lower shells 44c, 46c to promote the flow of fluids through the housing 42c. The apertures are typically in the order of 4.5 inches in diameter, with four apertures uniformly spaced about each of the domes 111. A central, smaller aperture, 115, which is in the order of 1.5 inches diameter, is provided in the dome 111 of upper shell 46c to facilitate venting of the central area of the dome.

Figure 13:
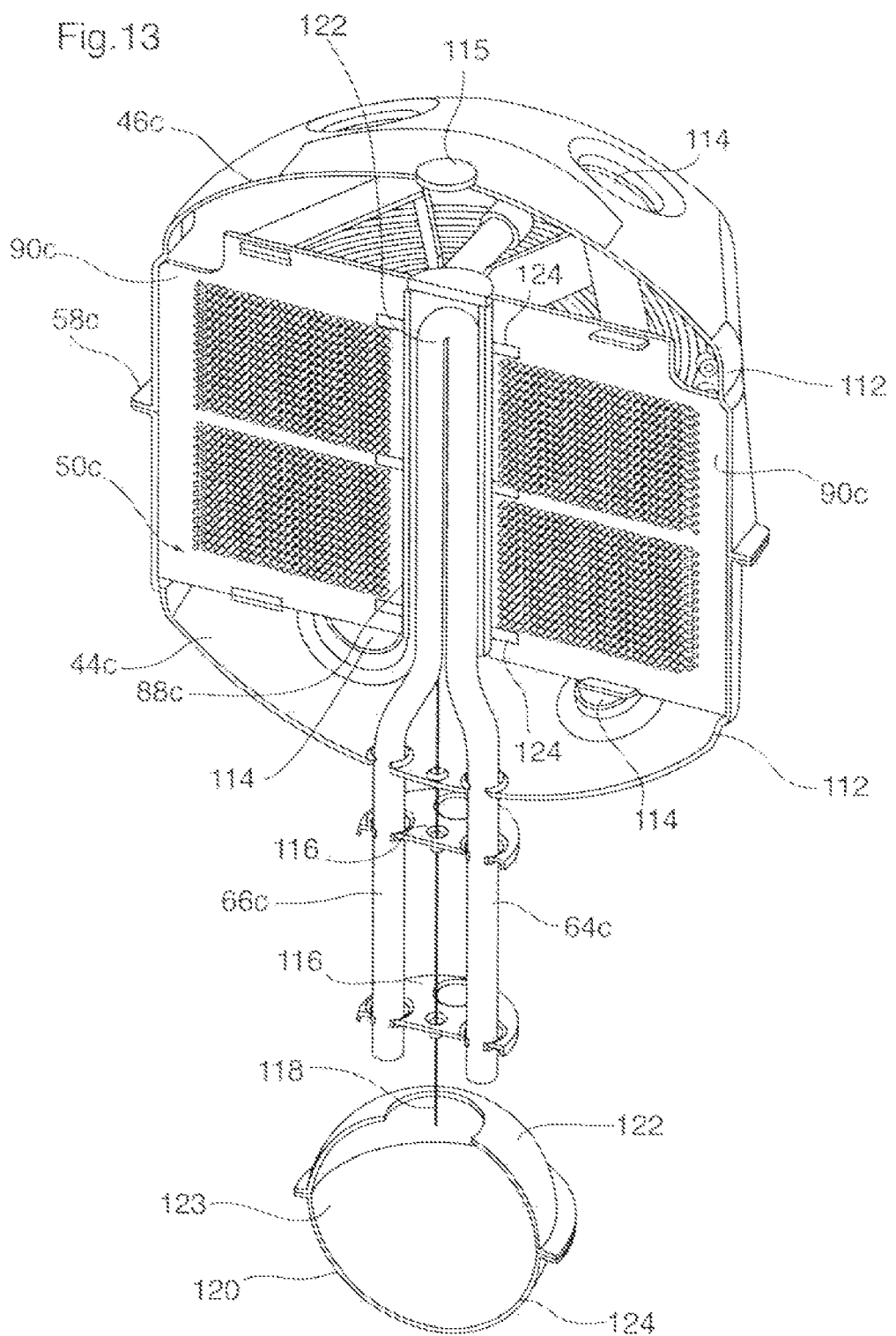
FIG. 13 is a section of the embodiment of FIG. 12.
Figure 14:
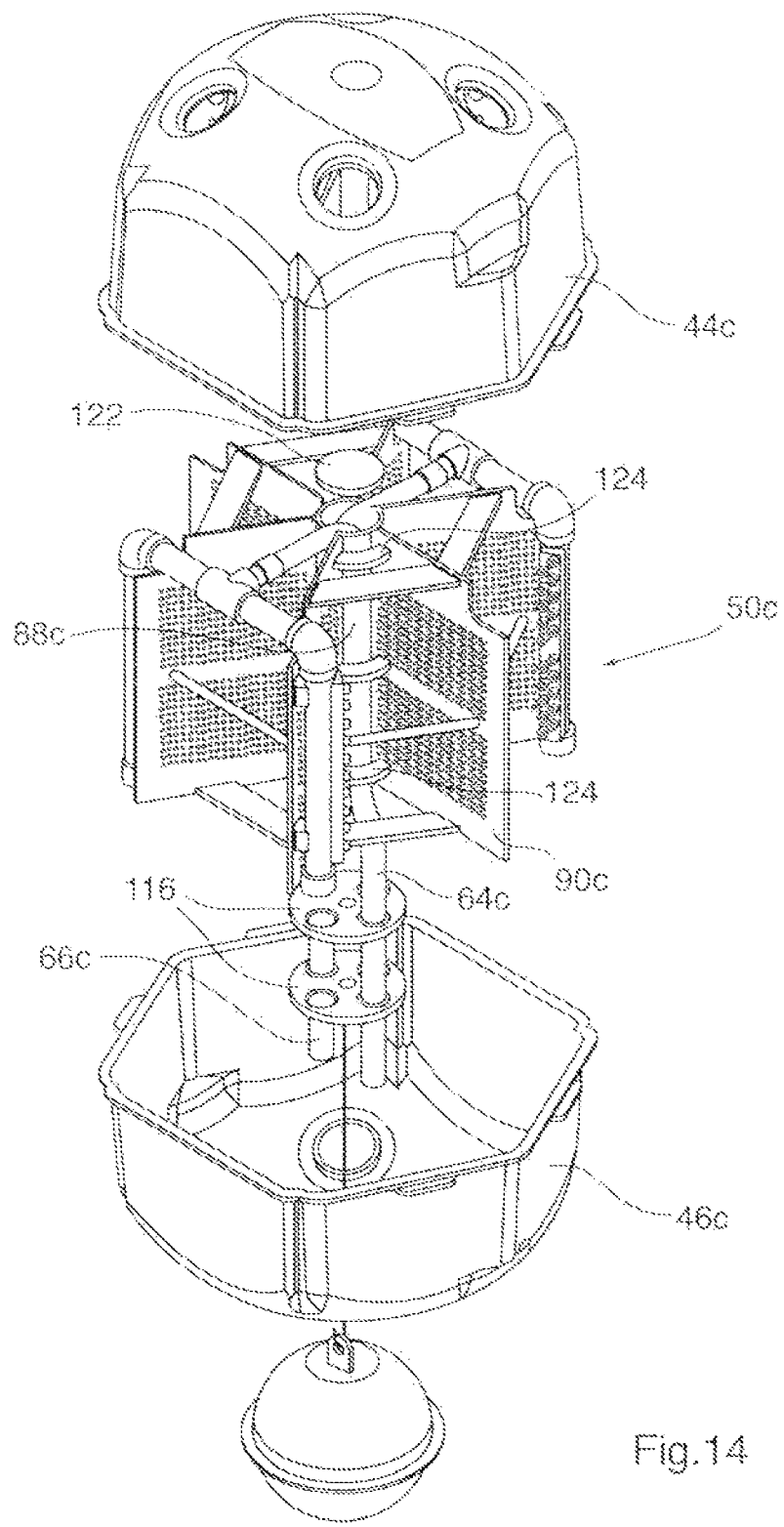
FIG. 14 is an exploded perspective view of the embodiment of FIG. 12.
Figure 17:
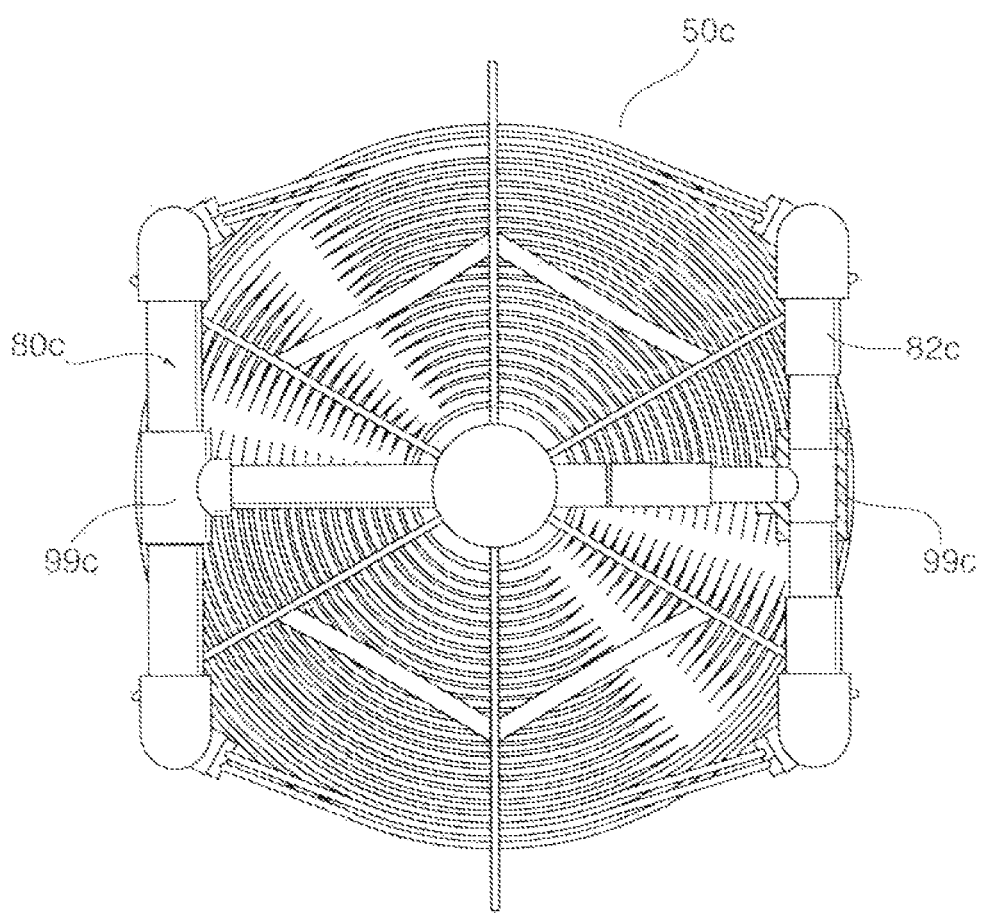
FIG. 17 is a plan view of the heat exchanger unit of FIG. 15.
Figure 18:
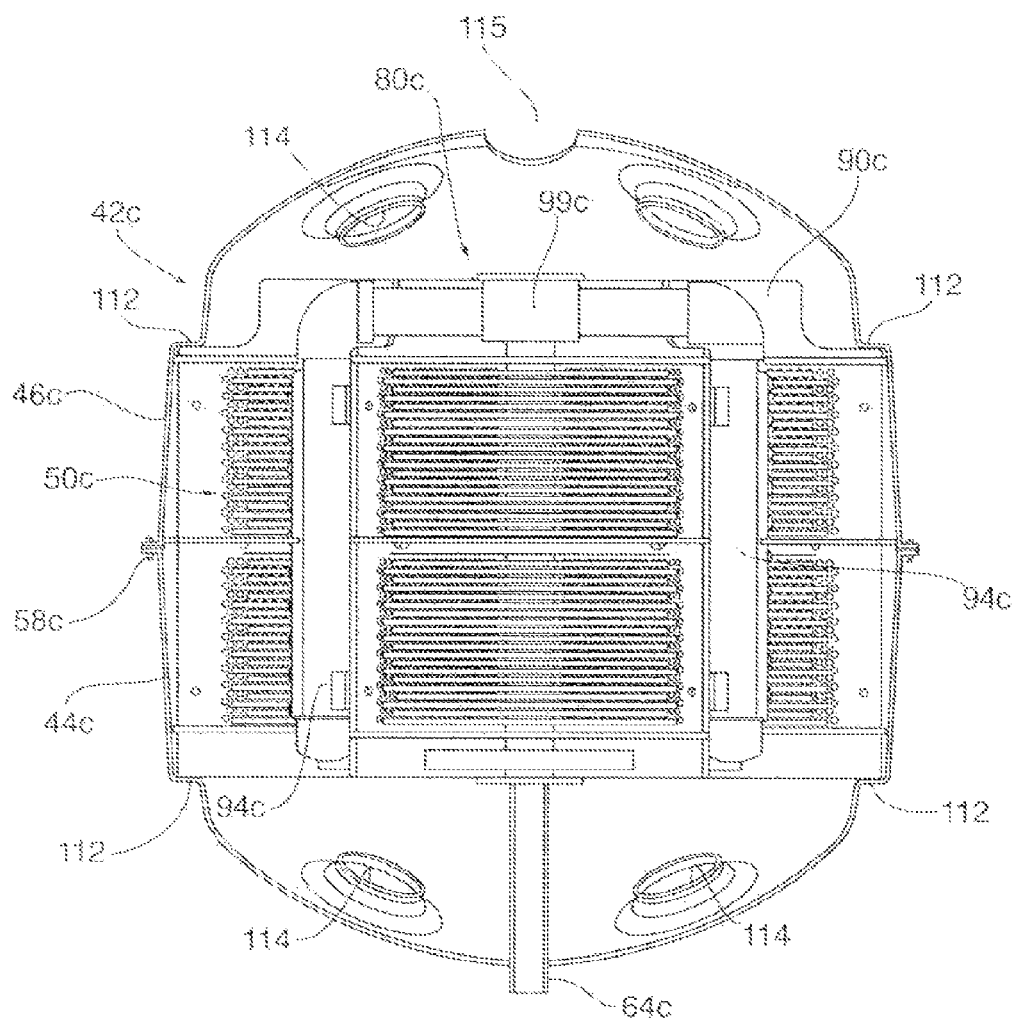
FIG. 18 is a view on the line XVIII-XVIII of FIG. 12.
Figure 19:
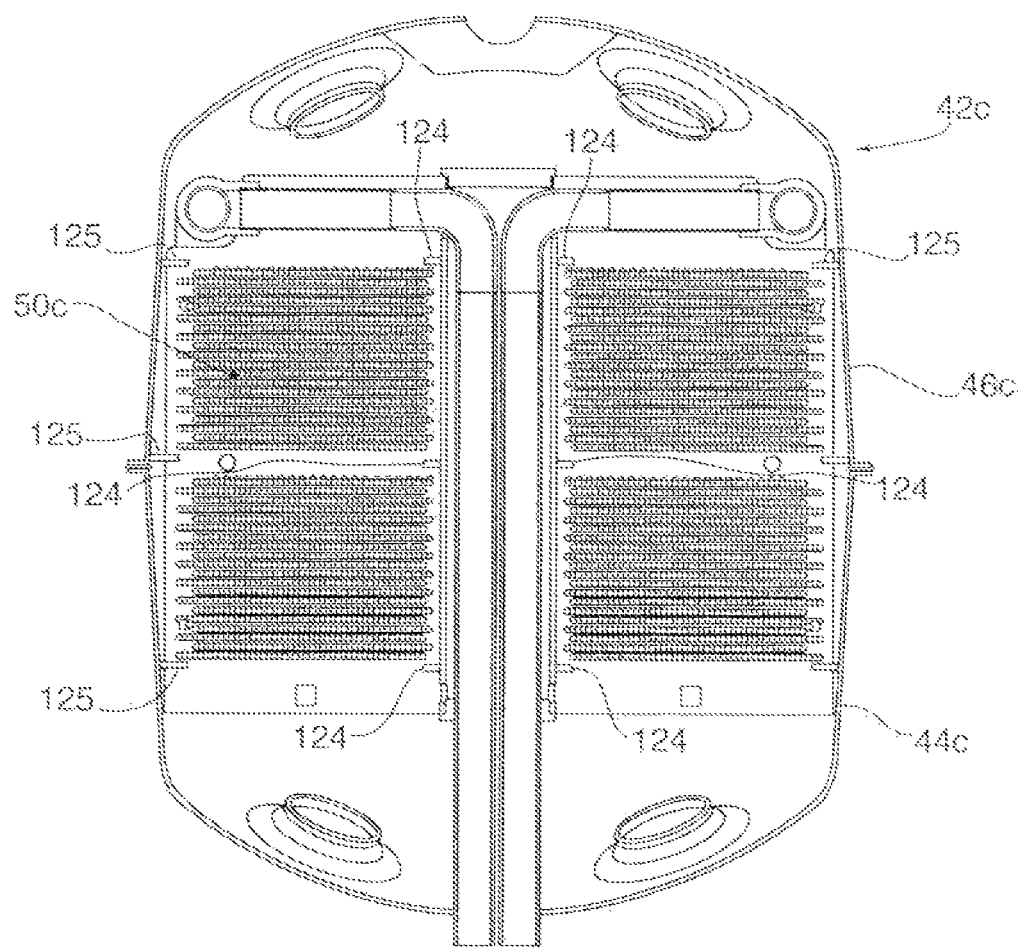
FIG. 19 is a section on the line XIX-XIX of FIG. 12.

The core 50c is similar to that described above with respect to FIGS. 3 and 4 with the T connectors 99c of inlet manifold 80c and outlet manifold 82c directed radially inwardly for the connection to the pipes 64c, 66c that extend radially from the column 88c. As can be seen in FIGS. 13, 15, and 16 baffles are installed within the housing 44c, 46c and the core 50c to direct the convective flow of liquid over the core 50C to maximize thermal transfer. As can be seen in FIGS. 13 to 16, a plug or cap 122 is fixed to the upper end of the column 88c to inhibit flow of fluid through the column 88c. A fluid tight seal is not required provided there is a significant impediment to flow. Further, baffles in the form of rings 124 are also provided on the outside of the column 88c to occlude the passage between the tubes 85c and the outer surface of the column 88c. Similarly, baffles 125 are provided between the shells 44c, 46c and the core 50c to inhibit internal circulation.

Assembly of the energy transfer unit 36 is similar to that described above with the pipes 64c, 66c, fed though central apertures in the lower housing 44c and the heat exchanger 50c located on the shoulders 112. The upper housing 46c is then positioned over the core 50c and the housings connected at the flanges 58c. The tether and guide rings are fed on to the pipes 64c, 66c, and the tether 118 adjusted to the desired length to maintain the unit 36c at the required depth in the water.

The pipes 64c, 66c are connected through the quick release couplings 68c to the supply pipe 34c and return pipe 36c, and the unit 36c positioned in the body of water. Circulation of the heat exchange fluid through the pipes 34c, 36c causes flow through the inlet pipe 64c, through the inlet manifold 80, the tubes 85c and to the outlet manifold 82. The vertical orientation of the legs 94c facilitates purging of air from the core 50c and allows the air to be entrained with the fluid delivered to the return pipe 36c. The unit 36c typically remains positively buoyant with the ballast in the anchor 120 maintaining the unit 36c at the requisite depth in the water. The typical minimum depth of water above the unit 36 is 4 feet, although other depths may be used to meet particular conditions.

In operation, assuming a cooling effect is required in the building 10 so heat is rejected in to the water, heat transfer fluid flowing in the 50c is at a higher temperature than the water within the unit 36c. The water is heated locally and becomes less dense, therefore rising within the housing. The induced flow is accommodated by the apertures 114 so that water flows out of the upper apertures 114 and is replenished by flow through the lower apertures 114. A circulation of water is thus promoted across the core 50c to enhance heat transfer. The close proximity of the wall of the housing to the core 50c, and the provision of the cap 122 and rings 124 and baffles 125 promotes flow across the core and avoids an internal recirculating flow path within the housing. The central aperture 115 also avoids a build up of colder fluid in the dome, that can invert the fluid flow in the housing and cause significant fluctuations of temperature at the core in some circumstances.

The flow promoted across the core 50c is beneficial in providing a self cleaning effect on the tubes that inhibits plant and animal growth, as well as enhancing heat transfer. The housing thus not only physically protects the core 50c, it also promotes the circulation of fluid across the core to enhance the heat transfer. Typically, the average clearance between the wall and the outer one of the heat exchange tubes 85 is in the order of less than 0.5 inch, which is sufficient to inhibit internal recirculation patterns. Where enhanced circulation is needed for particular configurations, the wall of the housing may be insulated with a layer of insulating material, such as a closed cell foam, to reduce the heat transfer across the wall and maintain the temperature differential between water within the housing and that outside.

The provision of the anchor, either the tether and ballast, or the stand shown in earlier embodiments, maintains the vertical orientation to assist the circulation through the apertures 114, while also minimising the footprint on the lake bed.

When servicing is required, the heat transfer fluid may be replaced by air through the pipes 34c, 36c, to increase the buoyancy and raise the unit 36c from the lake bed.

A further embodiment is shown in FIGS. 20 and 21 where like reference numerals will be used to identify like components with ha suffix "d" for clarity. The embodiment of FIGS. 20 and 21 is intended for shallow water applications where the unit 36d may be installed in shallow water, river, or a protected area, such as beneath a dock. In this embodiment, the outer shell 42d is formed as a cage with lattice walls 130 to permit flow of fluid through the cage. A heat exchanger core 50d located centrally within the cage 42d and inlet pipe 64d and outlet pipe 66d are disposed to extend to the midpoint of a wall 130 for connection with quick connect couplings 68d.

A cylindrical wall 132 is located within the cage to extend around the core 50d in close proximity to it. The wall 132 is spaced from the floor of the cage 130 to allow water to flow in to the core.

In operation, the heat from the core 50c promotes a circulation of water through the core from bottom to top of the wall 132, and so causes a flow over the heat exchange tubes. The perforated walls allow replenishment of the water as it is circulated, with the wall 132 promoting the vertical flow of the water across the core 50d.

In each of the above embodiments, a self contained heat transfer unit is provided that physically protects the heat exchanger core. In the ground source embodiments, the outer shell holds the buffer fluid to ensure efficient heat transfer to the ground. In the water source embodiments, enhanced heat transfer is obtained by promoting flow of fluid across the heat exchanger core.

The embodiment shown in FIGS. 20 and 21 may be implemented without a chimney sleeve, so that the core 50d is positioned in a cage with lattice walls, for situations where moving water is present (river, tide, and current) and flow through the core is maintained at a more efficient volume than that provided by internally generated convection.

What is claimed is:

1. An energy transfer unit for a geothermal system, said energy transfer unit including an outer housing, a heat exchanger located within said housing, said heat exchanger having oppositely directed end faces and an array of heat exchanger tubes to permit fluid to flow between said end faces, an inlet pipe extending from said housing to said heat exchanger to convey heat transfer fluid to said array of tubes of said heat exchanger and an outlet pipe extending from said housing to said heat exchanger to convey heat transfer fluid from said array of tubes of said heat exchanger, said outer housing having a pair of end walls, each extending across respective one of said end faces of said heat exchanger and an imperforate peripheral wall extending about said heat exchanger and between said end walls, each of said end walls having a plurality of apertures to permit flow of fluid in to and out of said housing, said flow passing through said housing and between said end walls of said heat exchanger.

2. The energy transfer unit of claim 1 wherein said heat exchanger includes an inlet manifold connected to said inlet pipe and an outlet manifold connected to said outlet pipe.

3. The energy transfer unit of claim 2 wherein an array of heat exchange tubes extends between said inlet manifold and said outlet manifold.

4. The energy transfer unit of claim 3 wherein each of said manifolds includes a pair of legs and an array of tubes extends from each leg of said inlet manifold to a respective leg of said outlet manifold.

5. The energy transfer unit of claim 4 wherein said legs of said manifolds are connected by a bridging pipe and said inlet pipe and said outlet pipe are connected to respective bridging pipes intermediate said legs.

6. The energy transfer unit of claim 5 wherein said tubes of each array are spirally wound.

7. The energy transfer unit of claim 6 wherein said heat exchanger includes a central column about which said tubes are spirally wound and said inlet pipe and said outlet pipe extend through said column from said housing to said manifolds.

8. The energy transfer unit of claim 1 wherein an anchor is connected to said outer housing to locate said energy transfer unit.

9. The energy transfer unit of claim 8 wherein said anchor includes a tether connected to a ballast member.

10. The energy transfer unit of claim 9 wherein guide rings are located on said tether at spaced intervals and said inlet pipe and said outlet pipe are secured to said guide rings.

11. The energy transfer unit of claim 9 wherein said ballast member includes a pair of shells adapted to be joined to one another to define a void in to which ballast can be inserted.

12. The energy transfer unit of claim 1 wherein said of said heat exchanger wall constrains fluid to flow through said array of said heat exchanger between said end faces from one side thereof to another.

13. The energy transfer unit of claim 12 wherein said array is spirally wound.

14. The energy transfer unit of claim 12 wherein said heat exchanger includes a central column and said array extends about said column.

15. The energy transfer unit of claim 14 wherein a cap is provided on said column to inhibit flow of fluid through said column.

16. The energy transfer unit of claim 14 wherein baffles are located between said array and said column to inhibit flow of fluid between said array and said column.

17. The energy transfer unit of claim 1 wherein said heat exchanger is secured in said outer housing by engagement of said outer housing with said heat exchanger.

18. The energy transfer unit of claim 17 wherein said outer housing includes shoulders formed in a wall thereof to engage said heat exchanger.

19. The energy transfer unit of claim 18 wherein said heat exchanger is cylindrical with radially extending frame members and said frame members engage said shoulders.

20. The energy transfer unit of claim 19 wherein said frame members support heat exchange tubes wound about a central column.

21. The energy transfer unit of claim 20 wherein said heat exchange tubes extend between an inlet manifold and an outlet manifold, and said inlet pipe and said outlet pipe are connected to respective ones of said manifolds.

22. The energy transfer unit of claim 21 wherein said inlet pipe and said outlet pipe extend through said column.

23. The energy transfer unit of claim 22 wherein a cap is provided on said column to inhibit flow of fluid along said column.

24. The energy transfer unit of claim 22 wherein baffles are provided between said column and said heat exchanger tubes to inhibit flow of fluid between said column and said tubes.

25. The energy transfer unit of claim 24 wherein said outer housing conforms to the periphery of said heat exchanger to inhibit flow between a wall of said housing and said heat exchange tubes.

* * * * *